United States Patent
Koizumi

(10) Patent No.: US 10,158,786 B2
(45) Date of Patent: Dec. 18, 2018

(54) IMAGE FORMING APPARATUS AND AUTHENTICATION METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinji Koizumi, Numazu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/728,583

(22) Filed: Oct. 10, 2017

(65) Prior Publication Data

US 2018/0035014 A1    Feb. 1, 2018

Related U.S. Application Data

(63) Continuation of application No. 14/982,485, filed on Dec. 29, 2015, now Pat. No. 9,819,832.

(51) Int. Cl.
 *H04N 1/04* (2006.01)
 *H04N 1/44* (2006.01)
 *H04N 1/00* (2006.01)

(52) U.S. Cl.
 CPC ....... *H04N 1/4433* (2013.01); *H04N 1/00204* (2013.01); *H04N 2201/0055* (2013.01); *H04N 2201/0094* (2013.01)

(58) Field of Classification Search
 CPC ............. H04N 1/4433; H04N 1/00204; H04N 2201/0094; H04N 2201/0055

USPC ............................................... 358/1.14, 1.15
See application file for complete search history.

(56) References Cited

U.S. PATENT DOCUMENTS

| | | | |
|---|---|---|---|
| 8,289,890 B2 | 10/2012 | Murayama | |
| 2008/0176516 A1 | 7/2008 | Kim | |
| 2011/0063663 A1 | 3/2011 | Kim et al. | |
| 2012/0293819 A1 | 11/2012 | Doui | |
| 2014/0157372 A1 | 6/2014 | Shimizu | |
| 2016/0292553 A1 | 10/2016 | Nagasawa | |
| 2017/0134609 A1* | 5/2017 | Park | H04N 1/00278 |

FOREIGN PATENT DOCUMENTS

JP    2013-093814    5/2013

OTHER PUBLICATIONS

Non-Final Office Action dated Oct. 7, 2016 corresponding to U.S. Appl. No. 14/982,485, filed Dec. 29, 2015.
Final Office Action dated Mar. 20, 2017 corresponding to U.S. Appl. No. 14/982,485, filed Dec. 29, 2015.

* cited by examiner

*Primary Examiner* — Houshang Safaipour
(74) *Attorney, Agent, or Firm* — Amin, Turocy & Watson LLP

(57) ABSTRACT

An image forming apparatus comprises a wireless communication section, a terminal authentication section and a login processing section. The wireless communication section wirelessly communicates with a terminal device of a user. The terminal authentication section authenticates the terminal device requesting a connection with the image forming apparatus. The login processing section processes the login of the user according to the authentication on the terminal device.

8 Claims, 8 Drawing Sheets

| USER ID | TERMINAL ID | BASIC SETTING |
|---|---|---|
| user_a | a1: b2: c3: d4: e5: f6 | COLOR、DUPLEX PRINT、2in1、... |
| user_b | b1: c2: d3: e4: f5: g6 | MONOCHROME、SIMPLEX PRINT、1in1、... |
| ... | ... | ... |

IMAGE FORMING APPARATUS AND AUTHENTICATION METHOD

CROSS-REFERENCE TO RELATED APPLICATIONS

This application is a Continuation of application Ser. No. 14/982,485 filed on Dec. 29, 2015, the entire contents of which are incorporated herein by reference.

FIELD

Embodiments described herein relate generally to an image forming apparatus and an authentication method.

BACKGROUND

In the past, for the reason of safety, a MFP (Multifunction Peripheral) is generally allowed to be used by a user who logs into the MFP. For example, the MFP authenticates a user through collating the information stored in an IC card held by the user with a password input by the user. In a case of authenticating a user through a storage medium such as an IC card, the MFP needs to be provided with an IC card reader or a like device for reading out information from the storage medium. The arrangement of such a device in the MFP leads to a rise in the cost of the MFP. Further, in a case of being authenticated based on an input password, a user needs to input a password for the use of the MFP. This operation is troublesome for the user and has a risk of leaking the password.

Thus, it is desired to develop an MFP which is capable of relieving the workload of the user while not increased in cost.

DETAILED DESCRIPTION

In accordance with an embodiment, an image forming apparatus comprises a wireless communication section, a terminal authentication section and a login processing section. The wireless communication section wirelessly communicates with a terminal device of the user of the image forming apparatus. The terminal authentication section authenticates the terminal device requested to be connected with the image forming apparatus. The login processing section processes the login of the user according to the authentication on the terminal device.

The image forming apparatus and the authentication method of the embodiment are described below with reference to accompanying drawings.

Figure 1:
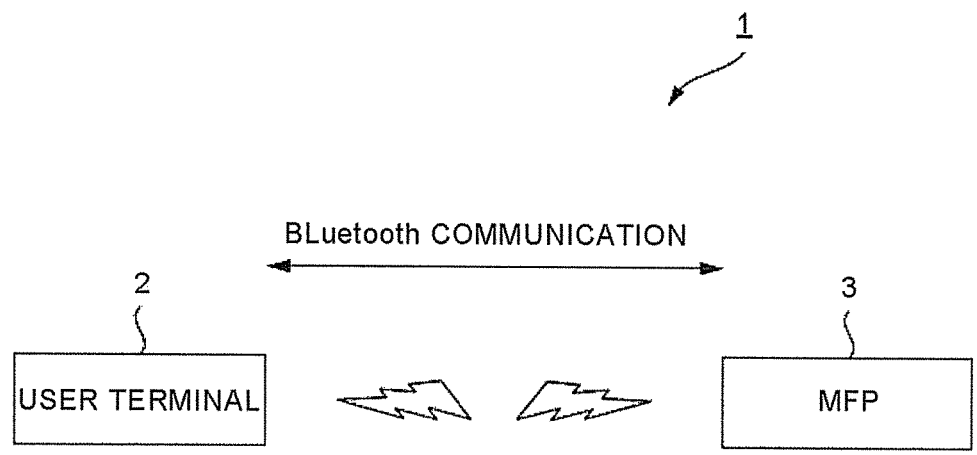
FIG. 1 is a system structure diagram exemplifying the schematic structure of an MFP system 1 according to an embodiment.

FIG. 1 is a system structure diagram exemplifying the schematic structure of an MFP system 1 according to the embodiment. The MFP system 1 comprises a user terminal 2 and an image processing apparatus 3. The user terminal 2 is a terminal which is operated by the user to log into the image processing apparatus 3. The user terminal 2 is, for example, a portable terminal such as a mobile phone, a smart phone and a tablet personal computer. An application which is used by the user to log into the image processing apparatus 3 is installed in the user terminal 2 in advance. The application is hereinafter referred to as a login APP. The image processing apparatus 3 is an image forming apparatus, for example, an MFP (Multifunction Peripheral). The image processing apparatus 3 can provide the user the various functions of an image forming apparatus, such as a copy function, a print function and a scan function. The user terminal 2 and the image processing apparatus 3 can wirelessly communicate with each other via a Bluetooth (Registered Trademark).

The user of the MFP system 1 operates the user terminal 2 to start the login APP. By starting the login APP, the user terminal 2 requests the user to log into the image processing apparatus 3 with which the user terminal 2 can wirelessly communicate. The image processing apparatus 3 carries out a processing of authenticating the user who requests login. If it is determined through the authentication processing that the user is a right user who requests login, the image processing apparatus 3 carries out a login processing for the user. The image processing apparatus 3 only allows a right user to log into the image processing apparatus 3 through the authentication processing.

One user terminal 2 and one image processing apparatus 3 are shown in FIG. 1; however, a plurality of user terminals 2 may request login to the image forming apparatus 3. Further, the wireless communication between the user terminal 2 and the image processing apparatus 3 may also be realized via another communication module different from Bluetooth (Registered Trademark).

Conventionally, such an authentication processing is carried out according to a user ID and a password input by the user. In such an authentication method, the user needs to input the user ID and the password every time the user logs into the image processing apparatus 3, resulting in a heavy workload. Through the wireless communication between the image processing apparatus 3 and the user terminal 2, the MFP system 1 is achieved which can be used through a simpler login operation. Next, the MFP system 1 of the embodiment is described below in detail.

Figure 2:
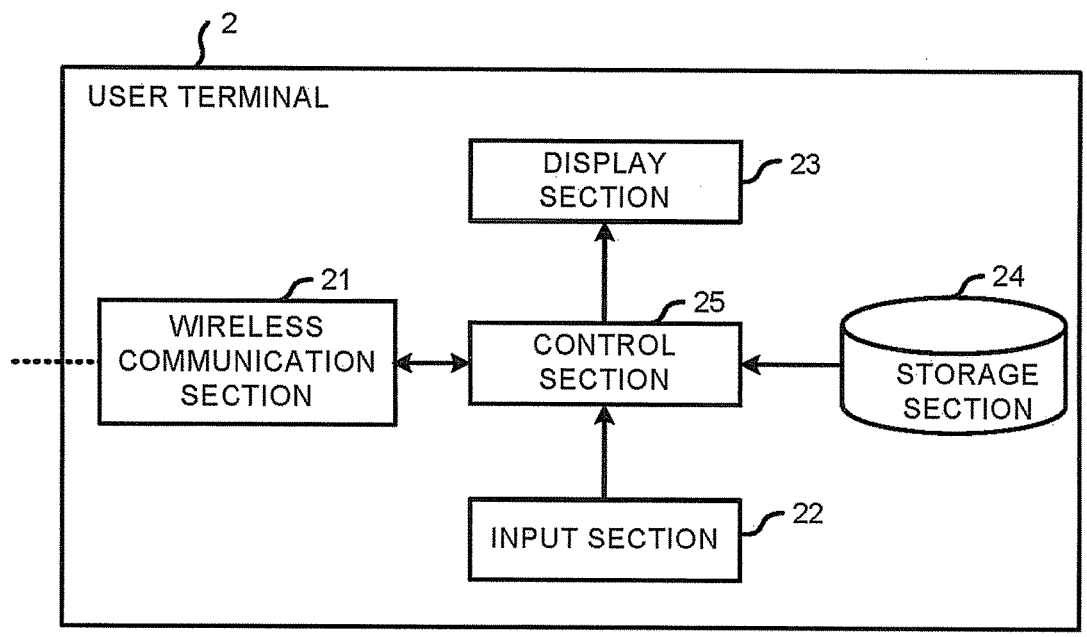
FIG. 2 is a functional block diagram illustrating the functional structure of a user terminal 2 according to the embodiment.

FIG. 2 is a function block diagram illustrating the functional structure of the user terminal 2 according to the embodiment. The user terminal 2 which includes a CPU (Central Processing Unit), a memory and an auxiliary storage device that are connected with each other via a bus line executes a user terminal program. By executing the user terminal program, the user terminal 2 functions as an apparatus provided with a wireless communication section 21, an input section 22, a display section 23, a storage section 24 and a control section 25. Further, the functions of the user terminal 2 can be totally or partially realized using hardware such as an ASIC (Application Specific Integrated Circuit), a PLD (Programmable Logic Device) and a FPGA (Field Programmable Gate Array). The user terminal program may be recorded in a computer-readable recording medium which refers to, for example, a movable medium such as a floppy disk, a magneto-optic disk, a ROM and a CD-ROM or a storage device such as a hard disk, which is built in a computer system. The user terminal program may be sent through an electrical communication line.

The wireless communication section 21 is a communication interface used by the user terminal 2 to wirelessly communicate with the image processing apparatus 3. In the present embodiment, the wireless communication section 21 is a communication interface for realizing wireless communication based on the Bluetooth (Registered Trademark).

The input section 22 consists of an input device such as a keyboard, a touch panel and the like.

The display section 23 consists of a display device such as a CRT (Cathode Ray Tube) display, a liquid crystal display, an EL (Electro-Luminescence) display and the like.

The storage section 24 consists of a storage device such as a magnetic hard disk device, a semiconductor storage device and the like. The login APP and the various setting information needed by the login APP to operate are stored in the storage section 24 in advance.

The control section 25 is a functional section for controlling the operations of the user terminal 2. For example, the control section 25 reads out the login APP from the storage section 24 and executes the login APP according to an operation of the user. By executing the login APP, the control section 25 requests the user to log into the image processing apparatus 3 with which the user terminal 2 can wirelessly communicate.

Figure 3:
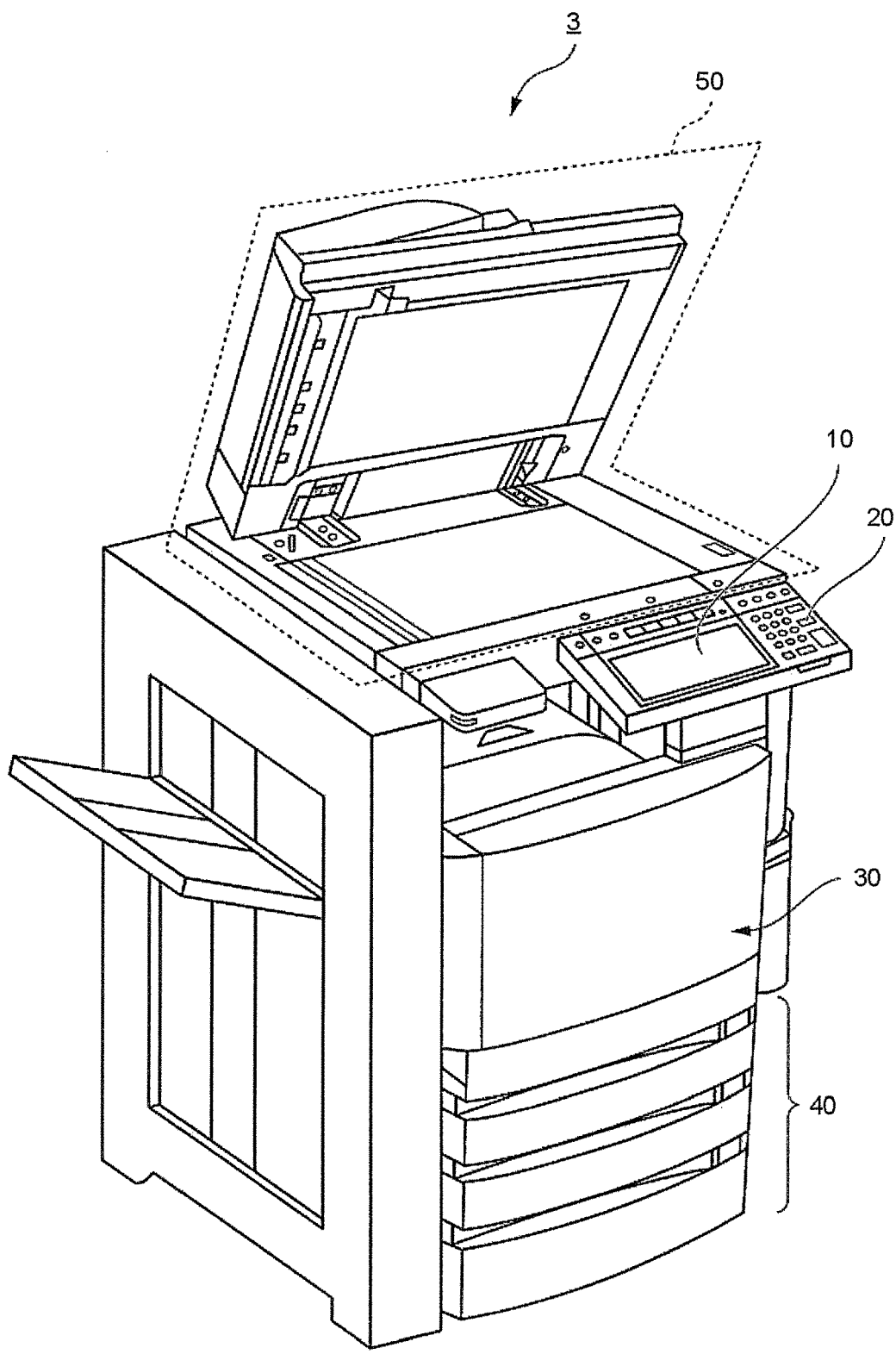
FIG. 3 is an external view exemplifying the overall structure of an image processing apparatus 3 according to the embodiment.

FIG. 3 is an external view exemplifying the overall structure of the image processing apparatus 3 according to the embodiment. The image processing apparatus 3 comprises a display 10, a control panel 20, a printer section 30, a sheet accommodation section 40 and an image reading section 50. The printer section 30 of the image processing apparatus 3 may be a toner image fixing device or an inkjet device.

The image processing apparatus 3 reads the image presented on a sheet and generates digital data, thereby generating an image file. The sheet is, for example, an original document or a sheet on which characters and an image is recorded. The sheet can be any sheet that is readable to the image processing apparatus 3.

The display section 10 is an image display device such as a liquid crystal display, an organic EL (Electro Luminescence) display and the like. The display section 10 displays various kinds of information relating to the image processing apparatus 3.

The control panel 20 comprises a plurality of buttons. The control panel 20 receives the operation of the user. The control panel 20 outputs a signal corresponding to an operation carried out by the user to the control section of the image processing apparatus 3. Further, the display 10 and the control panel 20 may be integrated into a touch panel.

The printer section 30 forms an image on a sheet according to image information generated by the image reading section 50 or the image information received via a communication path. The printer section 30 forms an image by, for example, carrying out the following processing: the image forming section of the printer section 30 forms an electrostatic latent image on a photoconductive drum according to the image information. The image forming section of the printer section 30 forms a visible image by making a developing agent adhere to the electrostatic latent image. The developing agent is, for example, a toner. The transfer section of the printer section 30 transfers the visible image onto a sheet. The fixing section of the printer section 30 heats and presses the sheet to fix the visible sheet on the sheet. Further, the sheet on which the image is formed may be a sheet accommodated in the sheet accommodation section 40 or a manually fed sheet.

The image information used in an image formation processing may be the image information generated by the image reading section 20 or the image information received via a communication path. The image information used in an image formation processing may further be the image information read from a recording medium.

The sheet accommodation section 40 accommodates a sheet which is used for the formation of an image in the printer section 30. The sheet used for the formation of an image is, for example, a paper or a label paper. The sheet used for the formation of an image can be any sheet with a surface on which an image can be formed.

The image reading section 50 reads the image information of a read object as light intensity. The image reading section 50 records the read image information. The recorded image information may be sent to another information processing apparatus via a network. The recorded image information may be formed by the printer section 30 into an image on a sheet.

Figure 4:
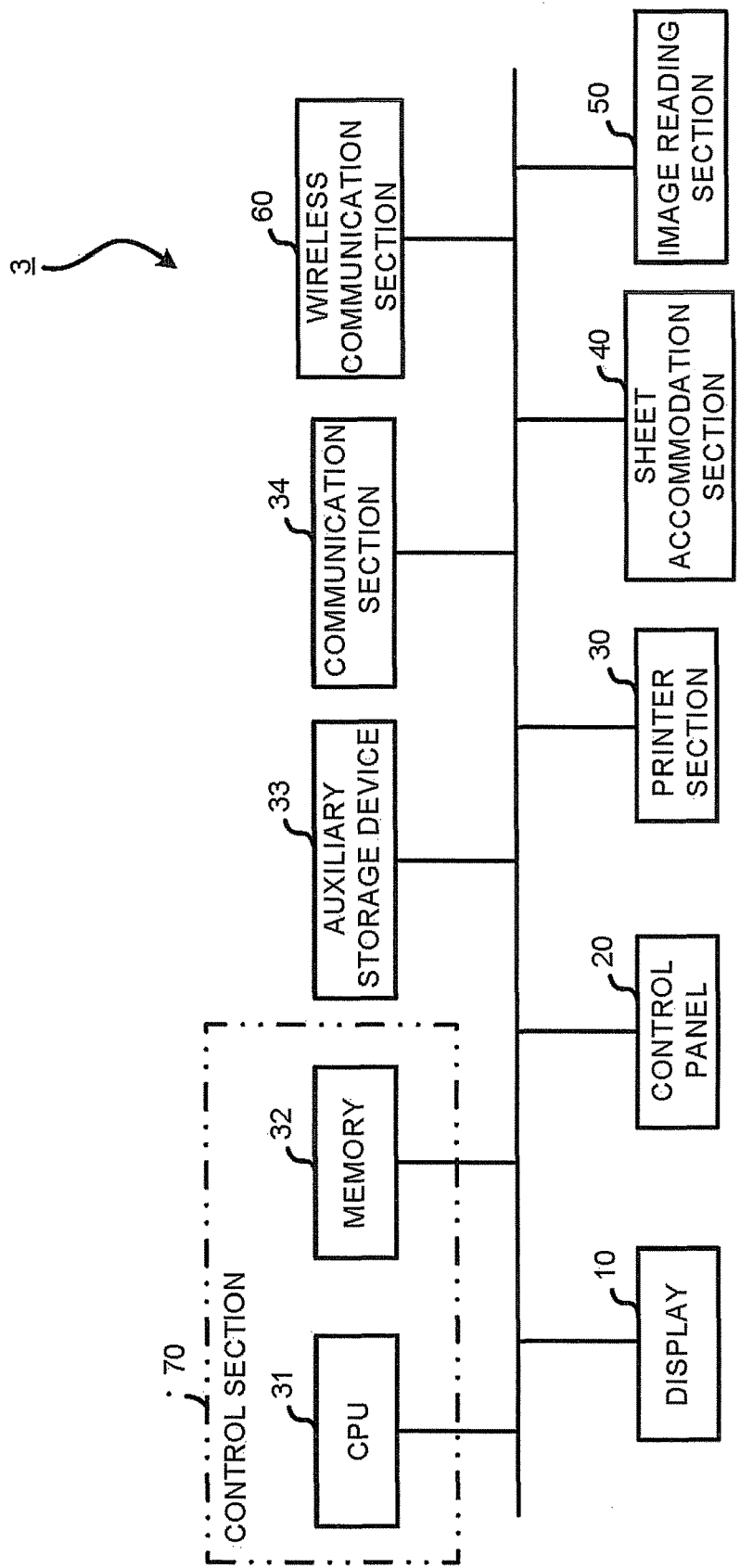
FIG. 4 is a functional block diagram exemplifying the functional structure of the image processing apparatus 3.

FIG. 4 is a functional block diagram exemplifying the functional structure of the image processing apparatus 3. The image processing apparatus 3 which comprises a CPU 31, a memory 32, an auxiliary storage device 33 and a communication section 34 that are connected with each other via a bus line carries out an image processing apparatus program. For example, the image processing apparatus program is stored in the auxiliary storage device 33. By executing the image processing apparatus program, the image processing apparatus 3 functions as an apparatus provided with the display 10, the control panel 20, the printer section 30, the sheet accommodation section 40, the image reading section 50, a wireless communication section 60 and a control section 70. Further, the functions of the image processing apparatus 3 can be totally or partially realized using hardware such as an ASIC, a PLD and an FPGA. The image processing apparatus program may be recorded in a computer-readable recording medium. The computer-readable recording medium refers to, for example, a movable medium such as a flexible disk, a magneto-optic disk, a ROM and a CD-ROM or a storage device such as a hard disk, which is built in a computer system. The image processing apparatus program may be sent through an electrical communication line.

The display 10, the control panel 20, the printer section 30, the sheet accommodation section 40 and the image reading section 50 are those shown in FIG. 3.

The wireless communication section 60 is a communication interface used by the image processing apparatus 3 to wirelessly communicate with the user terminal 2. In the present embodiment, the wireless communication section 60 is a communication interface for realizing wireless communication based on Bluetooth (Registered Trademark).

The control section 70 is a functional section controlling the operations of the image processing apparatus 3. For example, the control section 70 comprises a connection control section 71 and a login processing section 72. Provided with the connection control section 71 and the login processing section 72, the control section 70 is capable of controlling the login of the user to the image processing apparatus.

Figures 5, 6:
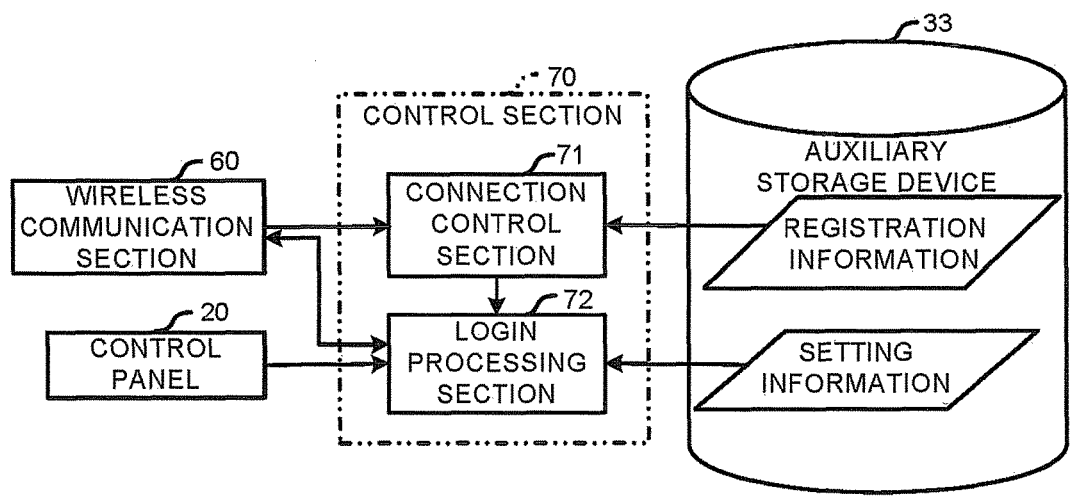
FIG. 5 is a functional block diagram illustrating the structure of a control section 70 for controlling the login of a user.
FIG. 6 is a diagram illustrating a specific example of setting information.

FIG. 5 is a functional block diagram illustrating the structure of the control section 70 for controlling the login of a user. The connection control section 71 controls the connection with the user terminal 2 that requests the user to log into the image processing apparatus. Typically, in Bluetooth (Registered Trademark), a previous connection permission setting which is called 'pairing' is required in machines which wirelessly communicate with each other. Through the pairing, registration information indicating the machines permitted to be connected with the image processing apparatus is generated in each machine. For example, information such as a Bluetooth (Registered Trademark) address and a Friendly Name is contained in the registration information. The connection permission setting is preset between the image processing apparatus 3 and the user terminal 2, and the registration information is stored in the auxiliary storage device 33 in advance. The connection control section 71 determines, according to the registration information of the image processing apparatus, whether or not the user terminal 2 serving as a connection source is a terminal permitted to be connected with the image processing apparatus. That is, the connection control section 71 authenticates, according to the registration information, the user terminal 2 that requests a user to log into the image processing apparatus. By authenticating such a user terminal 2 in this way, the connection control section 71 only permits the user terminal 2 which is permitted to be connected with the image processing apparatus in advance to be connected with the image processing apparatus.

The login processing section 72 carries out a login processing for the user of a user terminal 2 authenticated by the connection control section 71. By carrying out the login processing, the image processing apparatus 3 becomes usable to the user. For example, the login processing section 72 reads out setting information of each user pre-registered in the image processing apparatus to provide a corresponding service environment for each user. For example, the setting information is stored in the auxiliary storage device 33 of the image processing apparatus 3 in advance. The setting information can be properly changed by the manager or user.

FIG. 6 is a diagram illustrating a specific example of the setting information. For example, the setting information is stored in the auxiliary storage device 33 as a setting information table 331 exemplarily shown in FIG. 6. The setting information record of each user ID is stored in the setting information table 331. For example, the setting information record consists of a user ID, a terminal ID and the various values of a basic setting. The user ID is the identification information of the user of the image processing apparatus 3. The terminal ID is the identification information of the user terminal 2 which is used by the user represented by the user ID to log into the image processing apparatus 3. The terminal ID may be any information that can identify the user terminal 2, for example, the Bluetooth (Registered Trademark) address or Friendly Name contained in the registration information or a MAC (Media Access Control) address. The basis setting indicates a basic setting of the image processing apparatus 3 used by the user represented by the user ID. For example, the setting on print color, the setting on printed surface and the setting on aggregation are included in the basic setting. By reading such a basic setting of a user logging into the image processing apparatus, the image processing apparatus 3 provides a corresponding service environment for the user logging into the image processing apparatus.

Figure 7:
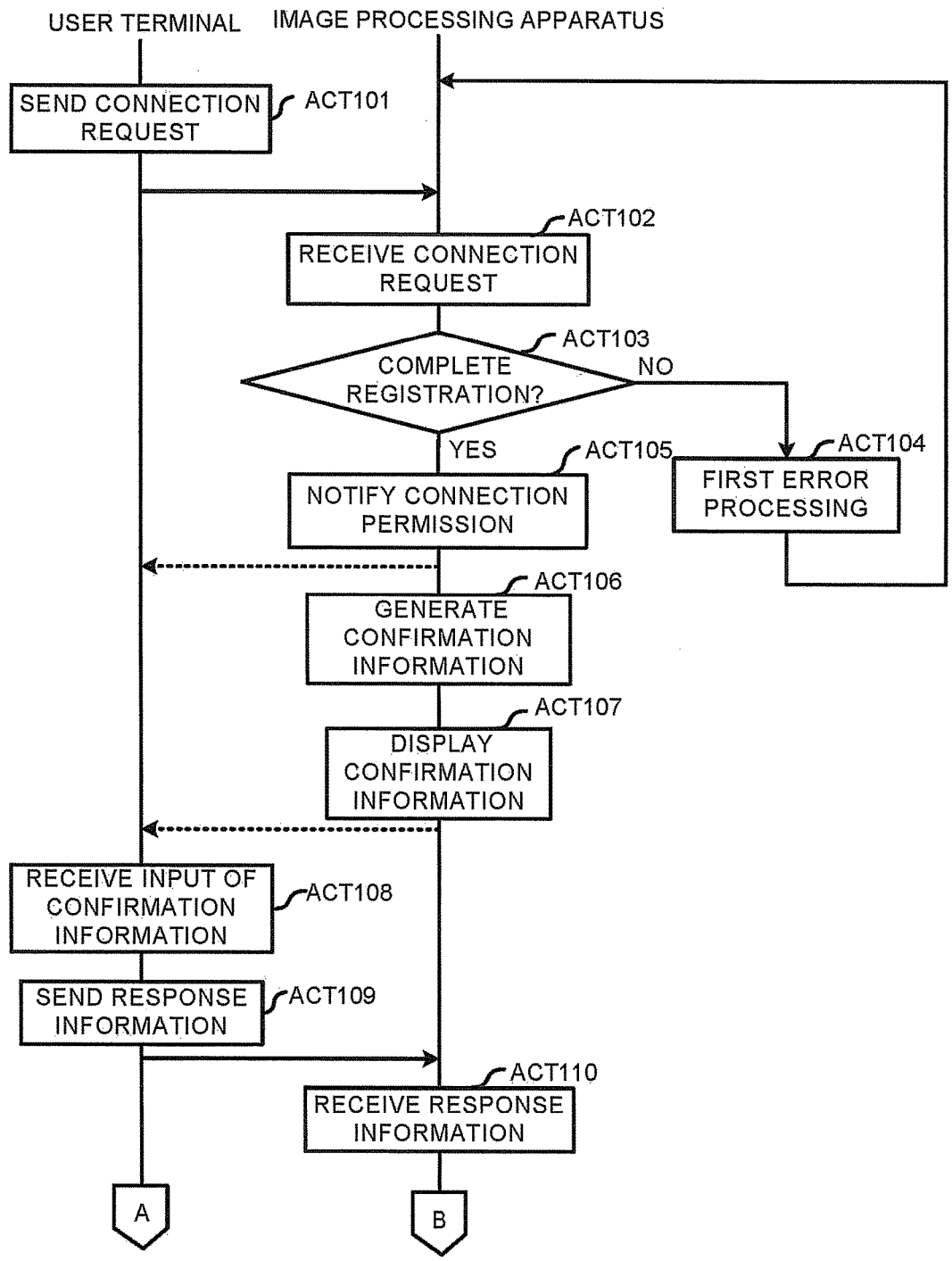
FIG. 7 is a sequence diagram illustrating the flow of a processing relating to the login of a user to the image processing apparatus 3 according to an embodiment.
Figure 8:
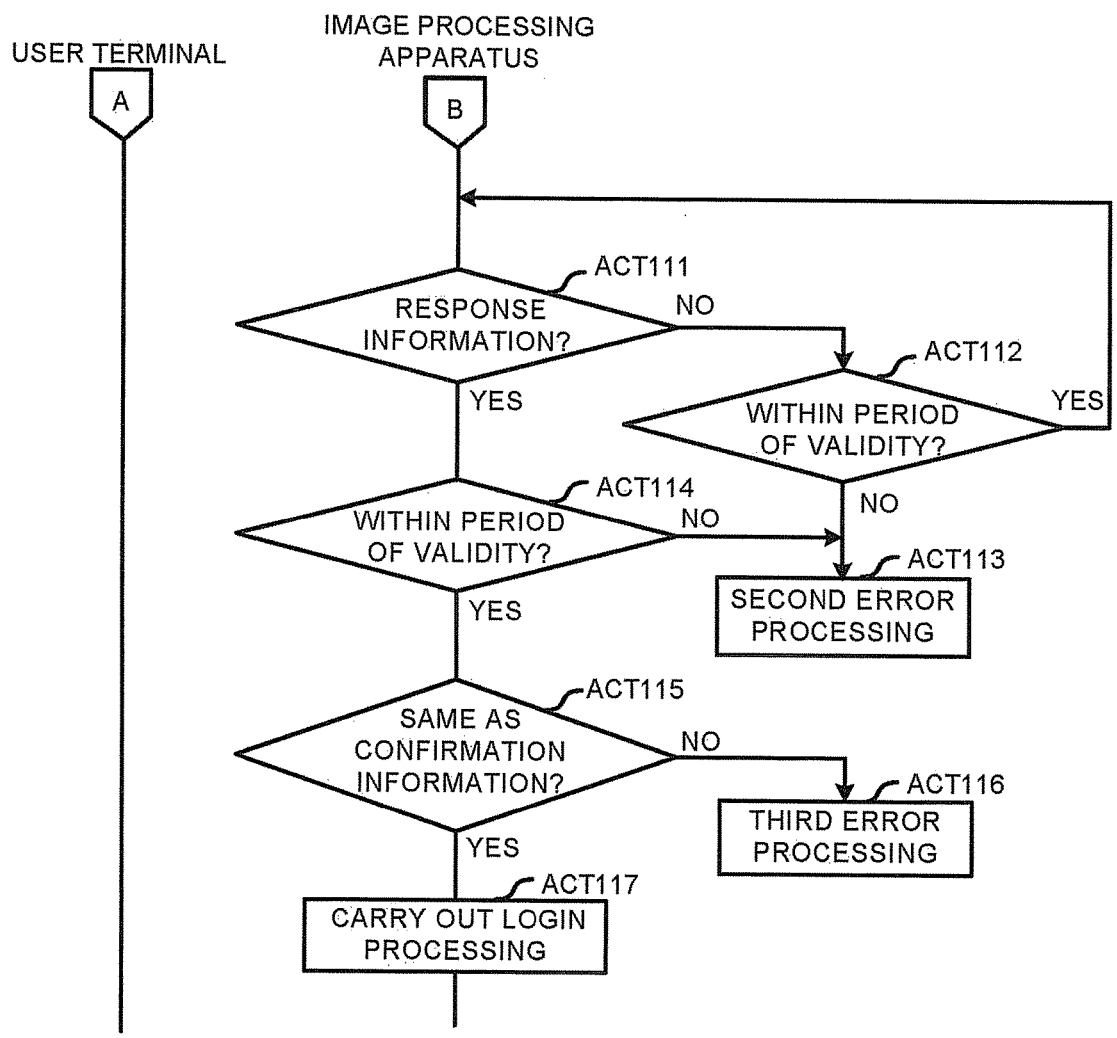
FIG. 8 is a sequence diagram illustrating the flow of a processing relating to the login of a user to an image processing apparatus 3 according to an embodiment.

FIG. 7 and FIG. 8 are sequence diagrams illustrating the flow of a processing relating to the login of a user to the image processing apparatus 3 according to the embodiment. Further, the login APP runs in the user terminal 2 in a case where the sequence shown in FIG. 7 and FIG. 8 is started. In this case, the user moves the user terminal 2 to a position where the user terminal 2 can wirelessly communicate with the image processing apparatus 3 to start the processing of the present sequence. The control section 25 of the user terminal 2 retrieves Bluetooth (Registered Trademark) terminals around the user terminal 2 at a specific timing through the login APP which is being executed. The control section 25 detects an image processing apparatus 3 with which the user terminal 2 can wirelessly communicate. The control section 25 requests the user to log into the detected image processing apparatus 3. Specifically, by attempting to connect the image processing apparatus 3 wirelessly, the control section 25 requests the user to log into the image processing apparatus 3.

The control section 25 sends a connection request to the image processing apparatus 3 (Act 101). The image processing apparatus 3 receives the connection request sent from the user terminal 2 (Act 102). The image processing apparatus 3 authenticates the user terminal 2 from which the connection request is sent. Specifically, the connection control section 71 determines whether or not the user terminal 2 from which the connection request is sent is already registered in the image processing apparatus 3 (Act 103).

For example, in Act 101, the control section 25 of the user terminal 2 sends a connection request containing the identification information of the user terminal 2 to the image processing apparatus 3. The connection control section 71 acquires the identification information of the user terminal 2 from which the connection request is sent from the connection request received in Act 102. The connection control section 71 determines whether or not the user terminal 2 is already registered in the image processing apparatus 3 by determining whether or not the acquired identification information is included in the registration information of the image processing apparatus. If the user terminal 2 is not registered in the image processing apparatus 3 yet (Act 103: No), the connection control section 71 carries out a first error processing (Act 104). The first error processing is a processing carried out to notify the user that the user terminal 2 is not registered in the image processing apparatus 3 yet.

Figure 9:
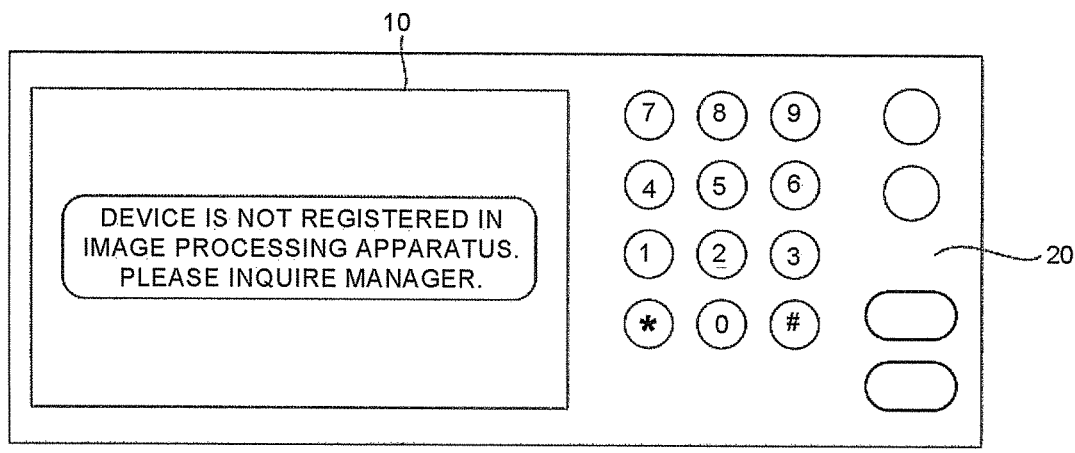
FIG. 9 is a diagram illustrating a specific example of a first error processing.

FIG. 9 is a diagram illustrating a specific example of the first error processing. For example, the connection control section 71 may display the error information shown in FIG. 9 on the display 10 to notify the user that the user terminal 2 is not registered in the image processing apparatus 3 yet. Apart from displaying error information in this way, the connection control section 71 may send the error information to the user terminal 2 to notify the user that the user terminal 2 is not registered yet.

Return to FIG. 7 and FIG. 8, on the other hand, if the user terminal 2 is already registered in the image processing apparatus 3 (Act 103: Yes), the connection control section 71 notifies the user terminal 2 that the user terminal 2 is permitted to be connected with the image processing apparatus (Act 105). Further, the connection control section notifies the login registration section 72 of the identification information of the user terminal 2 permitted to be connected with the image processing apparatus 3. The login registration section 72 generates confirmation information for the user of the user terminal 2 to confirm the intention of login (Act 106). The intention confirmation is carried out in consideration of a possibility that the terminal 2 used by the user who has no intention for login communicates with the image processing apparatus 3 wirelessly. Thus, the confirmation information is generated as information which is only valid in a specific period of validity. The login processing section 72 enables the display 10 to display the generated confirmation information (Act 107).

Figure 10:
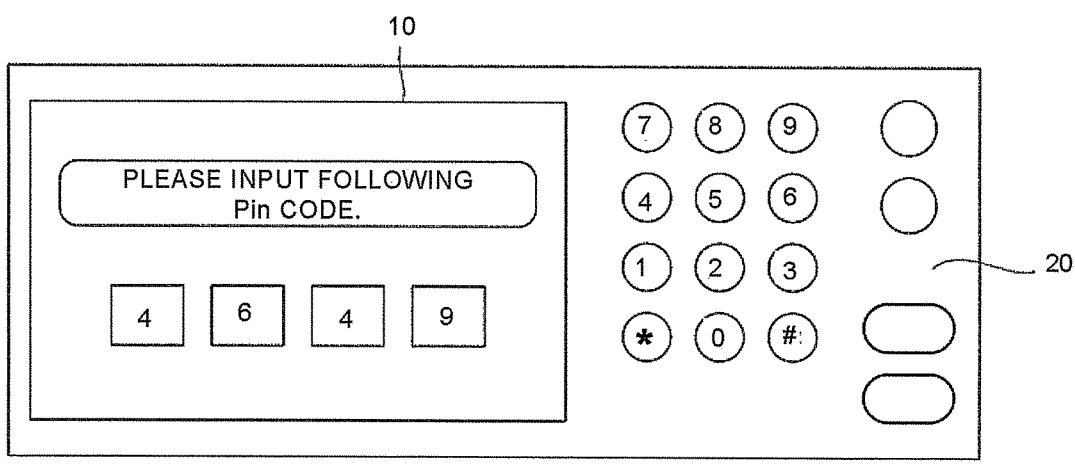
FIG. 10 is a diagram illustrating a specific example of a confirmation information display screen displayed on the image processing apparatus 3.

FIG. 10 is a diagram illustrating a specific example of a confirmation information display screen displayed on the image processing apparatus 3. For example, the image processing apparatus 3 enables the display 10 to display a screen for prompting the user to input confirmation information indicated by the four numbers shown in FIG. 10. The user visually confirms the confirmation information displayed on the display 10. In this case, a confirmation information input screen is displayed on the display section 23 of the user terminal 2 based on a connection permission notice. The user inputs the confirmation information displayed on the display 10 on the input screen displayed on the user terminal 2. Further, as stated above, the confirmation information is information which is only valid in a specific period of validity. Thus, to log into the image processing apparatus 3, the user needs to input the confirmation information displayed on the display 10 within the period of validity.

Return to FIG. 7 and FIG. 8, the input section 21 of the user terminal 2 receives the input of the confirmation information by the user (Act 108). The control section 25 sends the confirmation information input by the user to the image processing apparatus 3 as response information to a confirmation information notice (Act 109).

The image processing apparatus 3 receives the response information sent from the user terminal 2 (Act 110). The login processing section 72 of the image processing apparatus 3 determines whether or not response information is received (Act 111). If no response information is received (Act 111: No), the login processing section 72 determines whether or not the current moment is within the period of validity (Act 112). If the current moment is within the period of validity (Act 112: Yes), the login processing section 72 returns to Act 111 to repeat to confirm whether or not response information is received.

On the other hand, if the current moment is beyond the period of validity (Act 112: No), the login processing section 72 carries out a second error processing (Act 113). The second error processing is a processing carried out to notify the user that the input of the confirmation information is not carried out within the specific period of validity (time-out).

Figure 11:
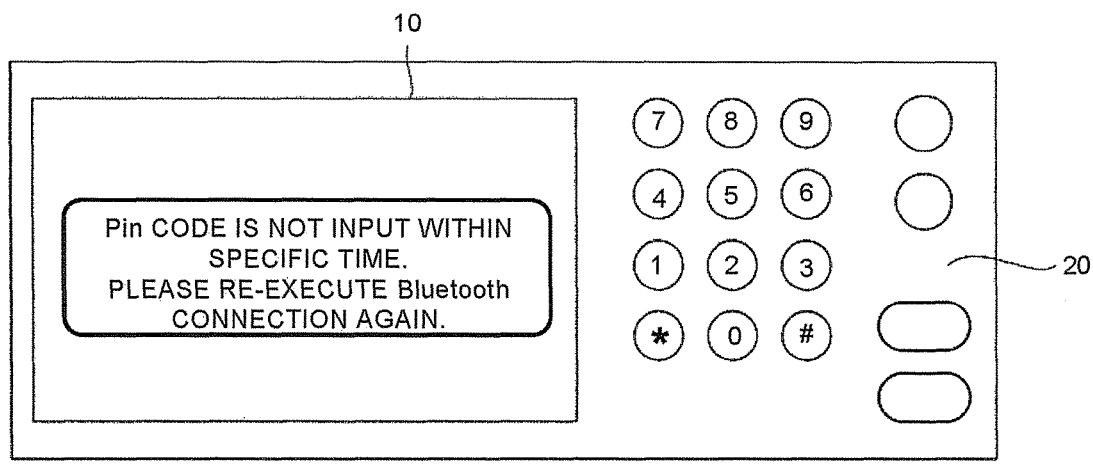
FIG. 11 is a diagram illustrating a specific example of a second error processing.

FIG. 11 is a diagram illustrating a specific example of the second error processing. For example, the login processing section 72 may enable the display 10 to display the error information shown in FIG. 11 to notify the user of the time-out of the input of confirmation information. Apart from displaying the error information in this way, the login processing section 72 may send error information to the user terminal 2 to notify the user of the time-out of the input of confirmation information.

Return to FIG. 7 and FIG. 8, on the other hand, if the response information is received in Act 111 (Act 111: Yes), the login processing section 72 determines whether or not the current moment is within the period of validity (Act 114). If the current moment is beyond the period of validity (Act 114: No), the login processing section 72 proceeds to Act 113 to carry out the second error processing. On the other hand, if the current moment is within the period of validity (Act 114: Yes), the login processing section 72 determines whether or not the received response information is the same as the confirmation information (Act 115).

If the received response information is not the same as the confirmation information (Act 115: No), the login processing section 72 carries out a third error processing (Act 116). The third error processing is a processing carried out to notify the user that the input confirmation information is not accurate.

Figure 12:
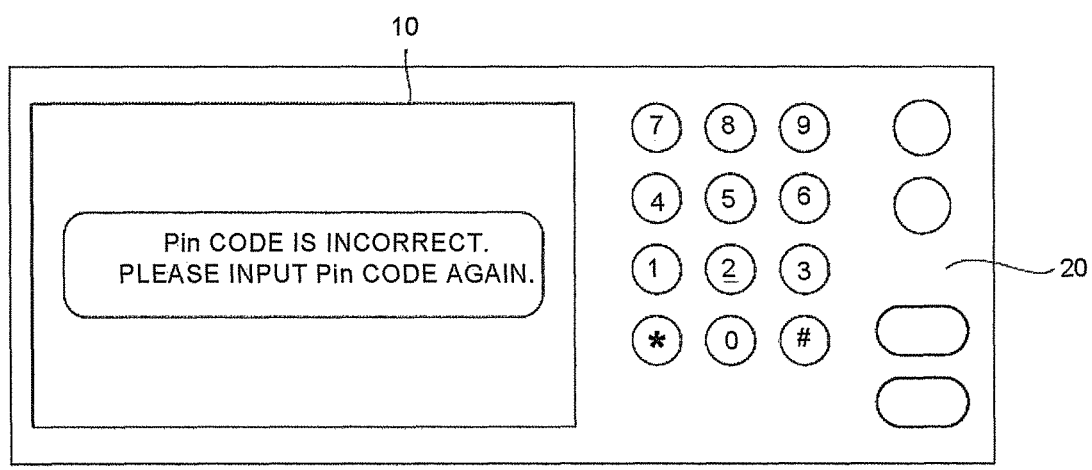
FIG. 12 is a diagram illustrating a specific example of a third error processing.

FIG. 12 is a diagram illustrating a specific example of the third error processing. For example, the login processing section 72 may enable the display 10 to display the error information shown in FIG. 12 to notify the user that the input confirmation information is not accurate. Apart from displaying the error information in this way, the login processing section 72 may send the error information to the user terminal 2 to notify the user that the input confirmation information is not accurate.

Return to FIG. 7 and FIG. 8, on the other hand, if the received response information in Act 115 is the same as the confirmation information (Act 115: Yes), the login processing section 72 carries out a login processing for the user of the user terminal 2 (Act 117).

The image processing apparatus 3 of the embodiment with the foregoing structure carries out a login processing for the user of the user terminal 2 at the moment the user terminal can wirelessly communicate with the image forming apparatus. With this function, the image processing apparatus 3 can relieve the workload of the user who uses it. For example, the input of a user ID and a password necessary for using the image processing apparatus 3 in the past can be saved. Further, the user can log into the image processing apparatus 3 merely by inputting confirmation information which is simpler than the input of a user ID and a password.

On the other hand, the communication between the user terminal 2 and the image processing apparatus 3 is carried out through Bluetooth (Registered Trademark) in the present embodiment. Generally, the image processing apparatus 3 can be provided with a Bluetooth (Registered Trademark) interface which is cheaper than an IC card reader. Thus, as stated above, if the image processing apparatus 3 is structured, then an image forming apparatus can be provided which is capable of relieving the workload of the user while not increased in cost.

Next, variations of the image processing apparatus 3 of the present embodiment are described below.

It is not necessary for the image processing apparatus 3 to carry out the intention confirmation of the login of the user based on confirmation information. The image processing apparatus 3 may carry out a login processing for the user of the user terminal 2 capable of wirelessly communicating with the image processing apparatus without requesting the user to input confirmation information. By saving the intention confirmation on login based on confirmation information, the image processing apparatus 3 with the foregoing structure is simpler for the user to log into. For example, the image processing apparatus 3 identifies, according to the radio wave intensity of the user terminal 2, the user terminal 2 of the user desiring to log into the image processing apparatus. For example, the image processing apparatus 3 may determine the user terminal 2 sending the strongest radio wave intensity as the user terminal 2 of the user desiring to log into the image processing apparatus. For example, the image processing apparatus 3 may determine the user terminal 2 which sends radio wave intensity above a specific threshold value as the user terminal 2 of the user desiring to log into the image processing apparatus. Further, the image processing apparatus 3 may determine the user terminal 2 which keeps sending radio wave intensity above a specific threshold value for more than a specific time as the user terminal 2 of the user desiring to log into the image processing apparatus. Further, in a case where there is a plurality of users serving as the object of a login processing at the same time, the image processing apparatus 3 may display the users on the display 10 and select one of the users as the object of the login processing.

Further, the image processing apparatus 3 may set, separately for each user, whether or not to carry out an intention confirmation based on confirmation information. For example, in this case, the image processing apparatus 3 sets whether or not to carry out an intention confirmation based on confirmation information in advance for each user ID registered in the setting information. The login processing section 72 generates confirmation information for the user logging into the image processing apparatus as required.

The confirmation information is not necessarily displayed on the image processing apparatus 3. Likewise, the confirmation information is not necessarily input in the user terminal 2. For example, the confirmation information may be sent from the login processing section 72 to the user terminal 2, and the control section 25 displays the confirmation information sent from the image processing apparatus 3 on the display section 23. In this case, the control panel 20 of the image processing apparatus 3 receives the input of the confirmation information.

The image processing apparatus 3 may establish an association between the authentication on the user terminal 2 to be connected with the image processing apparatus 3 and the intention confirmation of the user based on confirmation information, thereby authenticating the user. For example, in this case, the login processing section 72 of the image processing apparatus 3 makes the confirmation information generated according to a terminal ID notified by the connection control section 71 in the auxiliary storage device 33 in association with the terminal ID. For example, the login processing section 72 adds the value of confirmation information in a setting information record to establish an association between a terminal ID and the confirmation information. The control section 25 of the user terminal 2 sends response information containing the terminal ID of the user terminal 2 to the image processing apparatus 3. If the received response information is identical to the confirmation information corresponding to the terminal ID of the sending source, the login processing section 72 carries out a login processing for the user of the terminal. By authenticating the user in this way, the image processing apparatus 3 authenticate the user thereof more reliable.

The image processing apparatus 3 may also comprise a registration section (not shown) which registers an authentication-failed user terminal 2 in the image processing apparatus 3 if the user terminal 2 requesting a connection with the image processing apparatus fails in authentication. For example, in this case, the connection control section 71 outputs a notice to prompt the user of the authentication-failed user terminal 2 to register the user terminal 2. Moreover, the registration section adds the identification information of the user terminal 2 of the user in the registration information according to the response of the user to the notice which is output to prompt the user to register the user terminal 2. Provided with the registration section, the image processing apparatus 3 is more convenient to the user.

According to at least one of the foregoing embodiments, an image forming apparatus can be provided which comprises a wireless communication section configured to wirelessly communicate with a terminal device of the user, a terminal authentication section configured to authenticate the terminal device requesting a connection with the image forming apparatus; and a login processing section configured to process the login of the user according to the authentication on the terminal device and which is capable of relieving the workload of the user while not increased in cost.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
    a wireless communication section configured to wirelessly communicate with terminal devices;
    a storage configured to store registration information in advance, wherein the registration information indicates terminal devices that are permitted to connect to the image processing apparatus;
    a terminal authentication section configured to authenticate a terminal device of the terminal devices requesting to connect to the image forming apparatus; and
    a login processing section configured to carry out a login processing for a user of the terminal device authenticated by the terminal authentication section, wherein
    the terminal authentication section permits the terminal device to connect to the image forming apparatus if identification information, informed from the terminal device, indicating the terminal device is already registered in the registration information,
    the login processing section generates confirmation information for confirming an intention of the user of the authenticated terminal device to login to the image forming apparatus and displays the confirmation information, and
    the login processing section carries out the login processing for the user if a response information indicating the confirmation information is received from the terminal device during a specific period.

2. The image forming apparatus according to claim 1, wherein
    the confirmation information is valid in the specific period of validity; and
    the login processing section carries out the login processing for the user if the response information is received during the specific period of validity according to the display of the confirmation information.

3. The image forming apparatus according to claim 1, wherein
the login processing section displays an information that notifies the user that the response information has not been received during the specific period of validity if the response information is not received during the specific period of validity.

4. The image forming apparatus according to claim 1, wherein
the login processing section carries out the login processing corresponding to one or more of the terminal devices which are capable of wirelessly communicating with the image forming apparatus which sends radio wave with an intensity higher than a specific threshold value.

5. The image forming apparatus according to claim 1, wherein
the login processing section carries out the login processing corresponding to one or more of the terminal devices which are capable of wirelessly communicating with the image forming apparatus which is strongest in radio wave intensity.

6. The image forming apparatus according to claim 1, wherein
the login processing section carries out the login processing corresponding to one or more of the terminal devices which are capable of wirelessly communicating with the image forming apparatus which sends radio wave with an intensity higher than a specific threshold value for more than a specific time.

7. The image forming apparatus according to claim 1, wherein
the storage is further configured to store setting information of each user for login processing of each user in advance; and
the login processing section reads out the setting information of the user for whom the login processing will be carried out.

8. An authentication method performed by an image forming apparatus which comprises a wireless communication section configured to wirelessly communicate with terminal devices and a storage configured to store registration information in advance, wherein the registration information indicates terminal devices that are permitted to connect to the image processing apparatus, the authentication method comprising:
authenticating a terminal device requesting to connect to the image forming apparatus, wherein
permitting the terminal device to connect to the image forming apparatus if identification information, informed from the terminal device, indicating the terminal device is already registered in the registration information;
generating confirmation information for confirming an intention of the user of the authenticated terminal device to login to the image forming apparatus and displaying the confirmation information; and
carrying out the login processing for the user if a response information indicating the confirmation information is received from the terminal device during a specific period.

* * * * *